Sept. 4, 1956  W. B. CLARKE ET AL  2,761,507
FEEDING APPARATUS
Filed Dec. 7, 1954  4 Sheets-Sheet 1

INVENTORS.
William B. Clarke
Howard L. Hunter
Frank Santucci
BY Weff, Mackey + Burden
THEIR ATTORNEYS.

Sept. 4, 1956  W. B. CLARKE ET AL  2,761,507
FEEDING APPARATUS

Filed Dec. 7, 1954  4 Sheets-Sheet 3

INVENTORS
William B. Clarke
Howard L. Hunter
Frank Santucci
BY
THEIR ATTORNEYS

Sept. 4, 1956   W. B. CLARKE ET AL   2,761,507
FEEDING APPARATUS
Filed Dec. 7, 1954   4 Sheets-Sheet 4
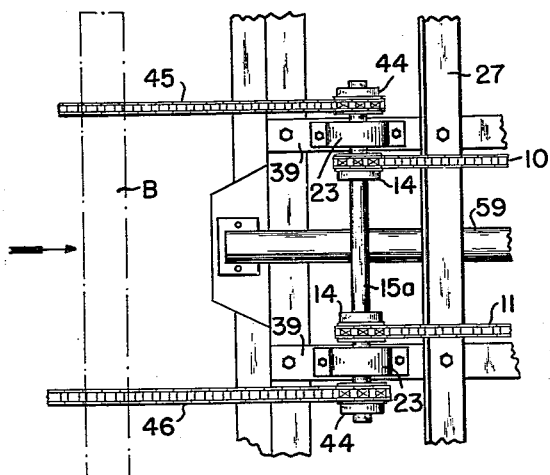
Fig. 6
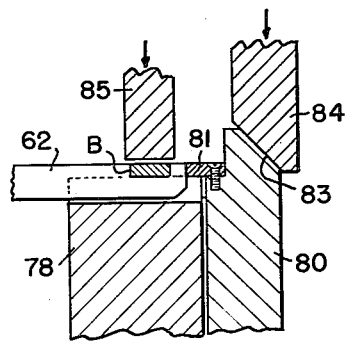
Fig. 7
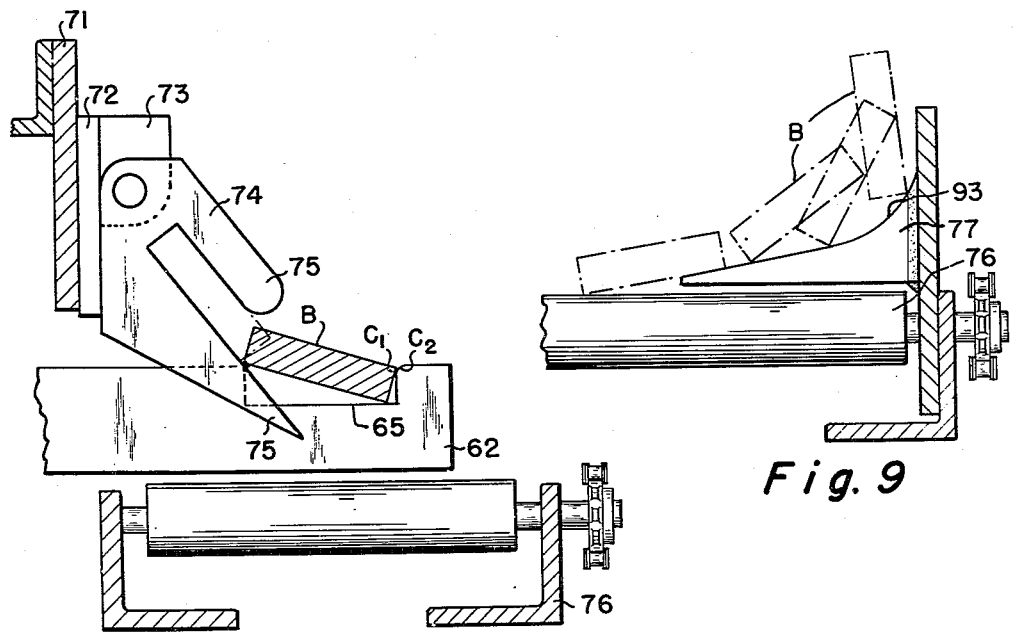
Fig. 8
Fig. 9
INVENTORS
William B. Clarke
Howard L. Hunter
Frank Santucci
BY
THEIR ATTORNEYS

United States Patent Office 2,761,507
Patented Sept. 4, 1956

2,761,507

FEEDING APPARATUS

William B. Clarke, Sewickley, Howard L. Hunter, McKees Rocks, and Frank Santucci, Coraopolis, Pa., assignors to Rockwell Spring and Axle Company, Coraopolis, Pa., a company Application December 7, 1954, Serial No. 473,515

11 Claims. (Cl. 164—88)

This invention relates to feeding apparatus and, more particularly, to apparatus designed automatically to feed a workpiece or similar article to a work station and then retract the workpiece and release it from the apparatus.

In processing articles such as metal bars or similar stock, it often is necessary to handle only a few at a time, especially when positioning one or more of the bars for a subsequent operation thereon. As an instance, bracket bars are heat treated and then punched or otherwise deformed in a die press one at a time. Several die press operations may be carried out in succession at different presses. Accordingly, it is necessary to transfer the bars singly from the heat treating furnace to the die press, remove the bar from the press, and advance it alone to one or more succeeding die presses for further operations until the single bar is completely fabricated. Heretofore, such processing of bars one at a time has been largely dependent on manual labor. In addition to the inherent dangers to operating personnel in handling very hot bars, the work is repetitious and quite fatiguing.

Moreover, following a die press operation, a bar often sticks to the bed of the die. This interrupts the rhythmic processing of the bars while the operator loosens and removes the stuck bar. As a result, the production rate is reduced.

We have developed automatic apparatus to pass a workpiece such as a metal bar through the indicated steps. When used with a die press or the like, our apparatus also prevents sticking of the bar to the bed of the press.

While our invention is disclosed in connection with the feeding of a hot bar to a die press, with which our apparatus is especially adapted as hereinafter described, it will be apparent that our invention is generally adapted to receive a moving workpiece from an initial station, feed the workpiece to a work station, retract the workpiece therefrom, and then release the workpiece from the apparatus and preferably also advance it to another station.

In one form, our apparatus includes a conveyor to receive and carry a workpiece to a pair of arms. The arms are reciprocated to advance the workpiece to a work station, where any desired operation may be performed on it, and then to retract the workpiece. Ejector means responsive to the backward movement of the arms lifts the workpiece and deposits it onto another conveyor which carries the workpiece to still a further station.

When the work station is a die press, the means for reciprocating the arms is preferably operated by fluid pressure of substantially a constant force. Just prior to or during the initial operation of the die press, the arms are slightly retracted by a force greater than the fluid pressure. After the operation of the press, the fluid pressure is allowed to reassert itself to move the arms and bar forward to their original positions in the die press, thereby breaking any tendency of the bar to stick to the bed of the die.

The accompanying drawings illustrate a presently preferred embodiment wherein:

Figure 6 is a partial plan view of our apparatus illustrating a modification for transferring a workpiece onto a conveyor;

Figure 7 is a longitudinal section of the die press of Figure 1 similar to that of Figure 2 and shows how operation of the press retracts the arms supporting the workpiece;

Figure 8 is a partial section of Figure 1 on the line VIII—VIII and illustrates ejector means; and Figure 9 is a partial section of Figure 1 on the line IX—IX and shows a cam for turning a bar after it has been released from the ejector means of Figure 8.

Structure

Figure 1:
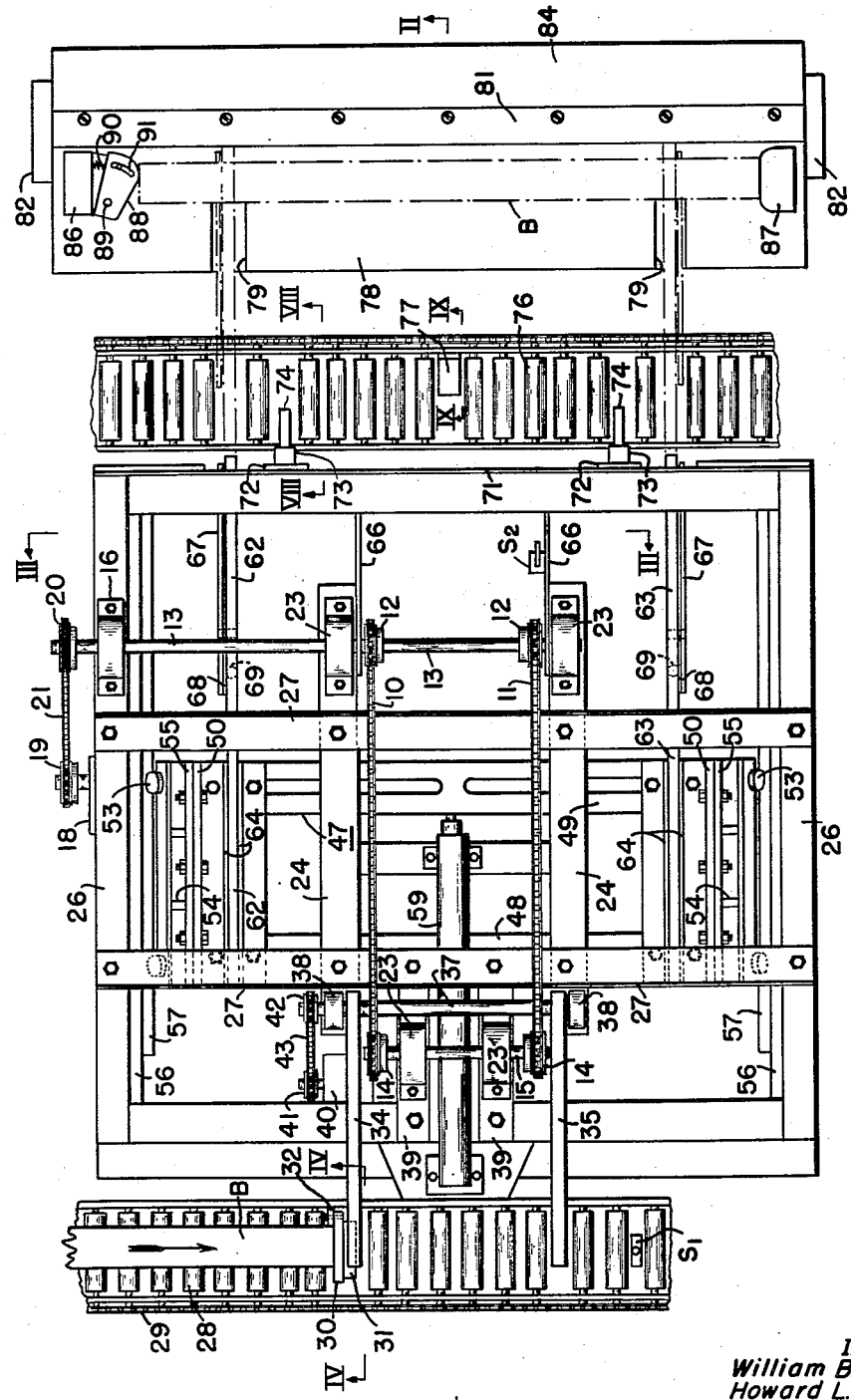
Figure 1 is a plan view of our feeding apparatus shown in conjunction with a die press.

Referring to the drawings, the embodiment shown includes spaced-apart link chains 10 and 11 trained about forward sprockets 12 mounted on a shaft 13 and about rearward sprockets 14 mounted on a shaft 15. Shaft 13 extends to one side where it is journaled in a pillow block 16 and conventionally driven by a motor 17 operating through a gear reducer 18, sprockets 19 and 20, and connecting chain 21. Runners 22 may be used to support the chains 10 and 11. Shafts 13 and 15 are journaled in pillow blocks 23 supported on angle beams 24 and 39. These beams and the other parts of the apparatus are carried by a framework including legs 25, longitudinal beams 26, and transverse beams 27.

Our apparatus contemplates means to advance a traveling article or workpiece onto the chains 10 and 11, whether the article approaches transversely to the chains or in line therewith. In the first instance, as shown in Figures 1, 2, 4, and 5, a roller table 28 driven by chain 29 carries a bar B in the direction of its length. A plate 30 having a side ledge 31 is pivoted to a bracket 32 at the side of the roller table and is urged to a raised position (Figure 5) by a spring 33. Two arms 34 and 35 each terminating in superposed fingers 36 are fixed to a shaft 37 mounted in pillow blocks 38 on angle beams 24. A reversible motor 40 rocks the shaft 37 through sprockets 41 and 42 and connecting chain 43.

If the workpiece approaches in line with the chains 10 and 11, the embodiment of Figure 6 may be used. In this case, a longer shaft 15a is used and carries sprockets 44 in addition to sprockets 14. Link chains 45 and 46 are trained about sprockets 44 and suitably journaled at their rearward ends. In this manner, chains 45 and 46 directly carry a bar B onto chains 10 and 11. The upper flight of chains 45 and 46 may be in the same plane as the upper flight of chains 10 and 11, but more often it is angularly related thereto.

Below the chains 10 and 11, there is a carriage 47 including angle beams 48 and 49 joined at their ends by plates 50. A bracket generally shown at 51 comprises strips 52 in which rollers 53 are journaled. Ribs 54 hold strips 52 from a plate 55 which is bolted to plate 50. A supporting bar 56 extends lengthwise of each side of the framework and has bolted thereto a track 57 provided with beveled surfaces 58 on which the rollers 53 ride. A double-acting air cylinder 59 mounted on the framework below the carriage has its piston rod 60 fixed to a lug 61 depending from the carriage.

The carriage 47 supports arms 62 and 63 which are fixed to angle irons 64 bolted to the carriage along its sides. These arms have slots 65 to receive a bar when the carriage is in the retracted position shown in Figure 2. The slots 65 are directly below skids 66 which lead from the forward ends of chains 10 and 11. A lever 67 is pivoted to one side of each of the arms 62 and 63 and spring-loaded by an end plate 68 (Figure 2) which engages a spring 69 recessed in an opening 70 in the arm. This construction enables a bar to settle in the slots 65 more resiliently.

Ejector means is stationed above each of the arms 62 and 63. In each case, a wall 71 supported on the framework carries a wear plate 72 and bracket 73 to which a plate 74 is pivoted. The plate has superposed downwardly projecting fingers 75. The heel of the lower finger butts against the wear plate 72 so that plate 74 is adapted only for upward pivoting from the position shown in Figure 2. Another roller table 76 is stationed directly beneath the ejector means. One or more detachable cams 77 for turning a bar may be stationed along the table 76.

A die press stationed beyond the roller table 76 includes a bed 78 having slots 79 to receive arms 62 and 63. Rearwardly of the bed there is a block 80 to which a pusher plate 81 is fixed. The block is adapted for movement toward and away from the bed in guides 82 and has a camming surface 83 engageable with a cam 84 to effect this movement. Preferably, the cam 84 is responsive to the movement of a die 85 and to this end may form an integral part of the die itself. End gauges 86 and 87 position the ends of the bar B with respect to the ends of the bed 78. For this purpose, gauge 86 has an arm 88 pivoted at 89 and resiliently backed by a spring 90. A pin and slot arrangement 91 guides the pivoting of the arm 88. The remaining parts of the die press are of standard construction.

*Operation*

As the roller table 28 advances a bar B, plate 30 stops the bar if the arms 34 and 35 are raised and therefore not in a position to receive it. Normally, however, these arms are in the lowered position shown in Figure 4 so that the lower finger 36 of arm 34 engages the ledge 31 and pivots the plate 30 out of the path of the bar. The latter passes between the fingers 36 of each of the arms 34 and 35 and strikes a limit switch $S_1$. This operates motor 40 to rock the shaft 37 so that arms 34 and 35 are raised over the link chains 10 and 11 as shown by the dotted lines 92 (Figure 2) and, after a suitable delay, returned to their original positions. In so doing, arms 34 and 35 catch the bar B and advance it onto the chains 10 and 11. As previously indicated, the embodiment of Figure 6 may also be used to advance a bar onto these chains. Chains 10 and 11 are constantly driven by motor 17 to feed the bar down skids 66 and into the slots 65 of arms 62 and 63. In passing down the skids, the bar trips limit switch $S_2$. This actuates the double-acting air cylinder 59 to move arms 62 and 63 forwardly into the slots 79 of the die press bed 78 where the bar is temporarily held. During the forward movement of arms 62 and 63, plates 74 are easily lifted and slide over the bar.

Figure 2:
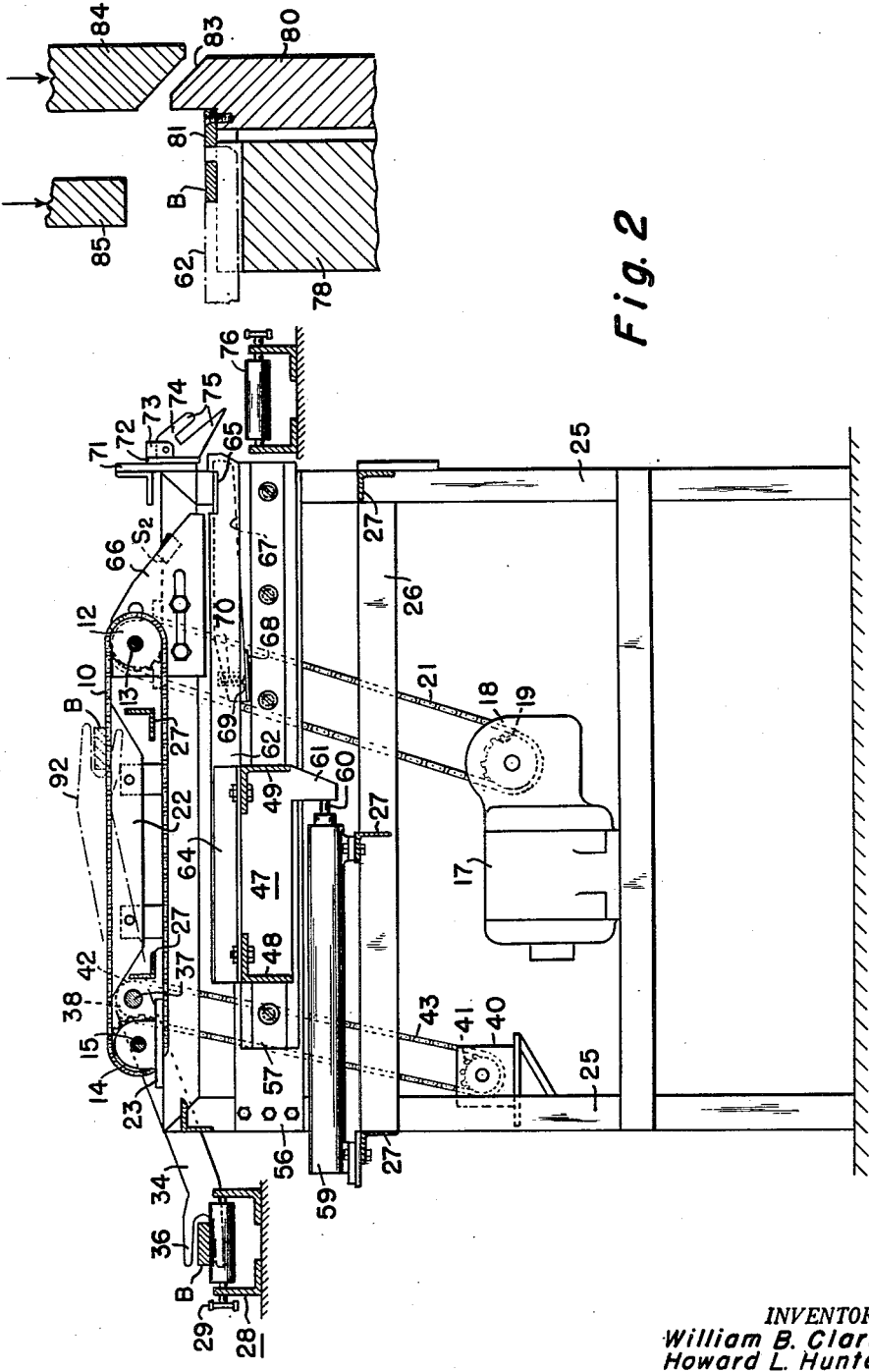
Figure 2 is a longitudinal section of Figure 1 on the line II—II.
Figure 3:
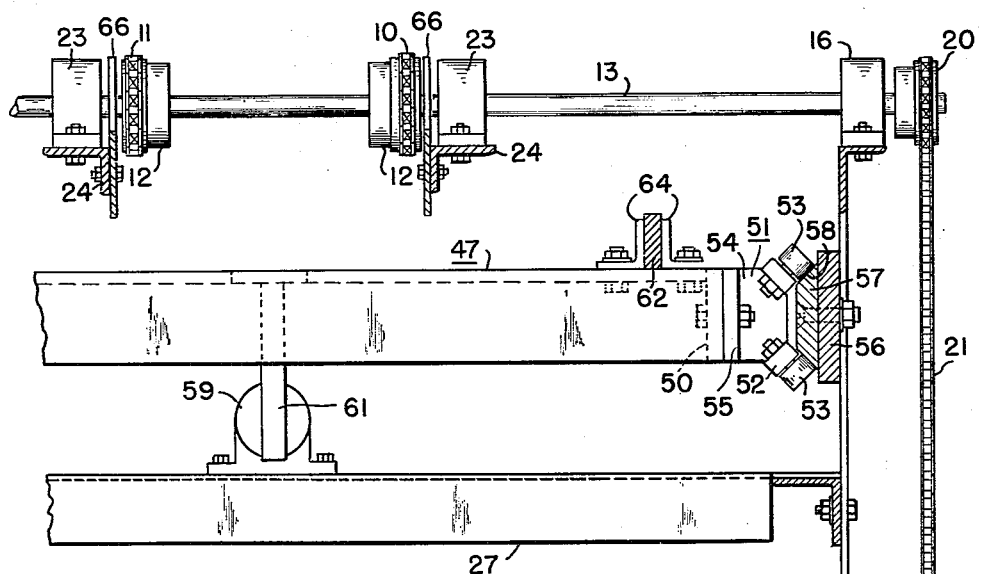
Figure 3 is a partial section of Figure 1 on the line III—III.
Figure 4:
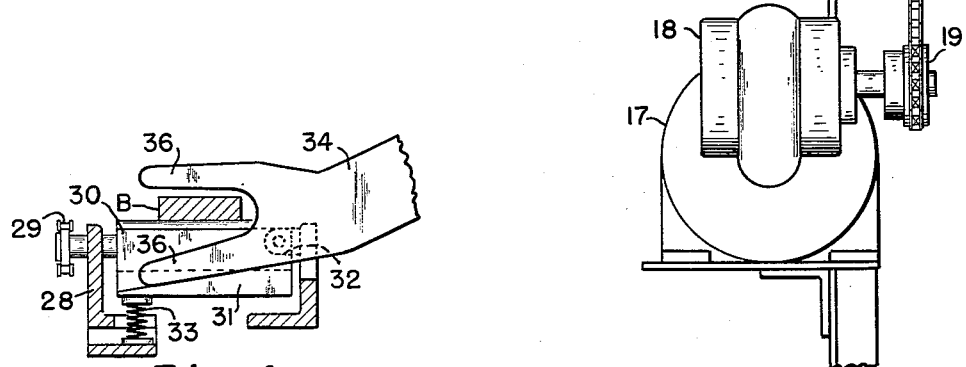
Figure 4 is a partial section of Figure 1 on the line IV—IV and illustrates arms depressing a stop to receive a bar.
Figure 5:
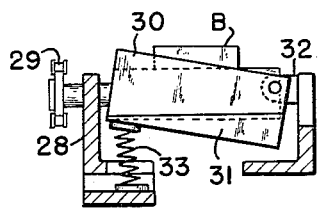
Figure 5 is a section similar to Figure 4 and shows the stop in a raised position.

At this time the press is operated either manually or automatically in response to the movement of arms 62 and 63. As the die 85 descends, cam 84 strikes the surface 83 thereby pushing the block 80 and plate 81 to the left as viewed in Figure 7. Since only the compressible pneumatic pressure of cylinder 59 maintains the arms 62 and 63 over the bed 78, the force exerted by the pusher plate 81, which is greater than the pneumatic pressure, is able to shove the arms 62 and 63 and therefore the bar they support somewhat to the left. This distance may be very small and by proper design of the camming action or of the width of plate 81, the bar B may be correctly positioned directly beneath the descending die 85 as desired. The die punches the bar or otherwise deforms it. Slots 79 protect the arms 62 and 63 from the action of the die. Upon raising the die and cam 84, the pneumatic pressure behind the arms 62 and 63 is again free to push the arms and bar to the right to their original positions (Figure 2). This return movement readily breaks any tendency of the bar B to stick to the bed 78.

Cylinder 59 now retracts the arms 62 and 63. During this backward movement, the lower fingers of the plates 74 catch the bar and, since the plates are unable to pivot in a clockwise direction (Figure 2), the bar is forced up into the slot between the upper and lower fingers 75. As shown in Figure 8, corner $C_1$ of the bar first pivots about corner $C_2$ of the slots 65, after which the adjacent side of bar B slides across corner $C_2$ as the bar rises between the fingers 75. Immediately after the arms 62 and 63 are past the plates 74, the bar drops onto the roller table 76 which carries the bar to another station, for example, another die press where apparatus similar to that just described may also be used.

It sometimes happens that for a succeeding die press operation, the bar must be turned about a longitudinal axis in order to position it correctly within the second press. Or the bar may have an offset portion as a result of the first die press operation which requires it to be turned in order to ride better over the roller table 76. In such cases, the detachable cam 77 is used. As shown in Figure 9, when the bar drops from the plates 74, the roller table 76 can be arranged so that the bar strikes the upper part of the camming surface 93. As the fall continues, the lower part of the bar is urged to the left so that the bar is turned by the time it reaches the roller table 76.

The circuits for operating the reversible motor 40 and the double-acting air cylinder 59, including time delay circuits, for example, to hold the arms 62 and 63 and bar B temporarily in the die press, are all of known design and therefore not illustrated. Also, any suitable means, independent of the operation of the die press, may be used for retracting the arms 62 and 63 while in the die press and thereby prevent the bar from sticking as previously described.

While the foregoing disclosure describes a presently preferred embodiment and a modification thereof, it is understood that the invention may be practiced in still other forms within the scope of the following claims.

We claim:

1. Apparatus including conveying means adapted to carry an articles, arms adjacent the conveyor means having a transversely slotted portion to receive the article and adapted for forward and backward movement, and ejector means onto which slotted portion positively shoves the article from the arms during backward movement thereof.

2. Apparatus including a conveyor adapted to carry an article, arms substantially paralleling the conveyor and having a slotted recess in one end thereof to retain the article, means to reciprocate the arms whereby on the forward movement of the arms the article is carried to a work station, and ejector means up which the article climbs from the recess in response to the backward movement of the arms to remove the article therefrom.

3. Feeding apparatus including a conveyor to advance an article, a carriage stationed below the conveyor adapted for reciprocable longitudinal movement, arms on the carriage formed with a locator slot to receive and retain therein the article from the conveyor whereby on the forward movement of the carriage the arms carry the article to a work station, and fingers up which the article climbs from the slot in response to the backward movement of the carriage to transfer the weight of the article thereto from the arms.

4. Feeding apparatus as claimed in claim 3 wherein there are lever arms beside the slot in the arms pivoted to the side of the latter and adapted to yieldably encounter the article initially for ease in settling in the slot when deposited by the conveyor.

5. In feeding apparatus incorporating a conveyor, means to advance an article onto the conveyor including the combination of a roller table transversely disposed to the conveyor adjacent its rearward end, a movable stop on the roller table adapted to stop the advance of said article when in a raised position, biasing means continuously effective to urge the stop upwardly into the aforesaid raised position, arms straddling and pivoted adjacent the sides of the conveyor adapted to pass between the rollers of the roller table, spaced-apart fingers on the ends of said arms, said stop having an engageable portion and arranged transverse to the path of the arms with at least one of the fingers of one arm being directly engageable with the engageable portion of the stop to depress it to a non-operative position, and means to pivot the arms, whereby upon directly depressing the stop the fingers of each arm receive an article therebetween and pivoting the arms places the article on the conveyor.

6. Apparatus including conveying means adapted to carry an article, arms adjacent the conveyor means to receive the article adapted for forward and backward movement, and ejector means to remove the article from the arms during backward movement thereof, said ejector means includes a plate terminating in superposed, downwardly-projecting fingers, said plate being pivoted to a wall portion stationed above the arms whereby the plate can pivot only upwardly so that, during said forward movement, the arms pivot the ejector means out of the path of travel and, during said backward movement, the article is caught between the fingers and lifted from the arms.

7. Feeding apparatus adapted to advance a workpiece to a work station, retract the workpiece, and then eject the workpiece from the apparatus including a conveyor adapted to carry the workpiece, a carriage stationed below the conveyor, arms fixed to the carriage and placed substantially parallel to the conveyor to receive the workpiece from the delivery end thereof, means to reciprocate the carriage in a direction substantially parallel to the arms, ejector means including a plate terminating in superposed fingers pivoted to a fixed point above the arms and adapted for upward pivoting only, whereby on the forward movement of the carriage, the arms carry the workpiece to a work station and, on the backward movement of the arms, the workpiece is caught between the fingers and lifted from the arms.

8. Feeding apparatus adapted automatically to receive a moving workpiece from an initial station, feed it to a work station, retract the workpiece therefrom, and then advance it to another station including a conveyor extending from the initial station and adapted to carry the workpiece, spaced-apart link chains, means to drive the chains, means to transfer the workpiece from the conveyor to the link chains, a carriage stationed below the chains, arms fixed to the carriage and placed substantially parallel to the chains to receive the workpiece from the delivery end thereof, means to reciprocate the carriage in a direction substantially parallel to the arms, ejector means including a plate terminating in superposed, downwardly-projecting fingers, said plate being pivoted to a wall portion stationed above the arms whereby the plate can pivot only upwardly, and a second conveyor stationed directly below the ejector means and below the arms adapted to carry the workpiece to another station, whereby during the forward movement of the carriage, the arms pivot the ejector means out of the path of travel and carry the workpiece to a work station and, during the backward movement of the arms, the fingers of the ejector means catch the workpiece therebetween to lift it from the arms and deposit the workpiece on the second conveyor.

9. Feeding apparatus as claimed in claim 8 wherein the second conveyor includes a cam to receive the workpiece from the fingers and turn it over during the descent to said second conveyor.

10. Apparatus including arms to receive conveyed articles adapted for a forward and backward path of movement therewith, a press for the articles adapted to receive the arms upon forward movement of the same, and a shiftable obstruction in the path having a slot into which the pressed article climbs from the arms during backward movement thereof.

11. In feeding apparatus incorporating a continuous conveyor and means to advance an article onto the conveyor, the combination therewith of arms operatively disposed adjacent the conveyor having article retaining means to retain the article to a portion of the arms after receiving an article relinquished by the conveyor, means to reciprocate the arms whereby on the forward movement of the arms the article is carried from the vicinity of the conveyor to a work station, and ejector means up which the article is shoved by the aforesaid portion of the arms in response to the backward movement thereof to remove the article from the retaining means on the arms.

References Cited in the file of this patent

UNITED STATES PATENTS

| | | |
|---|---|---|
| 517,171 | Saltzkorn | Mar. 27, 1894 |
| 1,259,359 | Carr | Mar. 12, 1918 |
| 1,295,195 | Parker | Feb. 25, 1919 |
| 1,756,584 | Cope | Apr. 29, 1930 |
| 2,029,456 | Zuber | Feb. 4, 1936 |
| 2,154,476 | Simpson | Apr. 18, 1939 |
| 2,314,154 | McCoy | Mar. 16, 1943 |
| 2,342,049 | Holmbeck | Feb. 15, 1944 |
| 2,377,262 | O'Leary | May 29, 1945 |
| 2,454,143 | England | Nov. 16, 1948 |
| 2,527,024 | Mitchell | Oct. 24, 1950 |
| 2,580,756 | Furman | Jan. 1, 1952 |
| 2,584,157 | Pechy | Feb. 5, 1952 |
| 2,679,919 | Koning | June 1, 1954 |

FOREIGN PATENTS

| | | |
|---|---|---|
| 856,128 | Germany | Nov. 20, 1952 |